United States Patent
Raffray et al.

Patent Number: 5,805,443
Date of Patent: Sep. 8, 1998

[54] PROGRAMMABLE CONTROL FOR HEATING INSTALLATION

[75] Inventors: Patrick Raffray, Hirel; Alain Roger, Cuguen, both of France

[73] Assignee: Societe Delta - Dore S.A., Combourg, France

[21] Appl. No.: 785,701

[22] Filed: Jan. 17, 1997

Related U.S. Application Data

[63] Continuation of Ser. No. 335,547, Nov. 7, 1994, abandoned.

[30] Foreign Application Priority Data

Nov. 9, 1993 [FR] France .................................. 93 13609

[51] Int. Cl.⁶ ............................ G06F 17/00; G05D 23/00
[52] U.S. Cl. ........................ 364/140; 236/46 R; 235/375
[58] Field of Search ..................................... 364/140, 141, 364/143–145, 191–193, 400, 492, 493, 505; 235/375; 165/11.1, 200, 209, 220, 237, 238; 236/51, 46 R, 47, 94

[56] References Cited

U.S. PATENT DOCUMENTS

| | | | |
|---|---|---|---|
| 4,319,712 | 3/1982 | Bar | 236/47 |
| 4,634,846 | 1/1987 | Harvey et al. | 235/375 |
| 4,980,542 | 12/1990 | Jackson et al. | 235/375 |
| 5,156,203 | 10/1992 | Funakoshi et al. | 165/12 |
| 5,203,497 | 4/1993 | Ratz et al. | 236/46 R |
| 5,435,147 | 7/1995 | Mochizuki et al. | 236/51 |

FOREIGN PATENT DOCUMENTS

| | | |
|---|---|---|
| 0121200 | 10/1984 | European Pat. Off. . |
| 0493366 | 7/1992 | European Pat. Off. . |
| 2900627 | 1/1980 | Germany . |
| 2052100 | 1/1981 | United Kingdom . |
| 2052800 | 1/1981 | United Kingdom . |
| 2213610 | 8/1989 | United Kingdom . |

*Primary Examiner*—Paul P. Gordon
*Assistant Examiner*—Steven R. Garland
*Attorney, Agent, or Firm*—Laff, Whitesel, Conte & Saret, Ltd.

[57] ABSTRACT

A programmable control apparatus for a heating installation of the type that comprises a clock (8) and a processing unit (2) is provided to control one or more heating appliances of the installation according to programming data. The programming data are either programming data stored in the memory of a card (11), of the type that is known as "smart cards." This data is read out when such a card (11) is introduced into a reader (10) of the apparatus. The programming data resident in the processing unit (2) operates the heating system when no card is introduced into the reader (10). The stored programming data can be manually modified only if a card (11), known as a "key card", is introduced into the reader (10).

4 Claims, 1 Drawing Sheet

PROGRAMMABLE CONTROL FOR HEATING INSTALLATION

This application is a continuation of application Ser. No. 08/335,547, filed Nov. 7, 1994, now abandoned.

This invention concerns programmable control apparatus for a heating installation.

BACKGROUND

This type of apparatus is already known. They generally consist of a processing unit to which one or more heat sensors are linked to determine the temperature of one or more areas of the heating installation, and control units for one or more heating appliances in the areas. A keyboard, or some other entry/exit control system, allows the processing unit to be programmed, i.e., to allocate to each area a projected holding temperature for a period of time in the day, and this, for example, for each day of the week.

The data engendered by the keyboard or the entry/exit control system, at the time of programming, are stored in the memory of the processing unit. In this description, this data will be called the programming data.

Providing the programming operation for this type of apparatus is tricky. In fact, the number of functionalities is relatively large. The apparatus requires a long time and a tedious procedure to program, or, on the other hand, the apparatus is simple to programme and the number of functionalities relatively restricted.

The aim of the invention is to provide apparatus which allows a programming operation according to several modes, each of the modes adapt the programming to suit the requirements of the user.

Another disadvantage of known equipment lies in the fact that programming data can be modified by anyone and in particular by persons who are not familiar with the functioning of the equipment, like children. The risk of an error in functioning could ensue.

Another aim of the invention is to provide apparatus which overcomes such a disadvantage.

SUMMARY OF THE INVENTION

The above-mentioned aims are achieved by producing equipment in which the programming data used by the processing unit are either programming data read in the memory of a card, known as a "smart card", when such a card is introduced into a reader of the equipment, or programming data residing in the processing unit when no card is introduced into the reader. The resident programming data can be modified only if a card, known as a "key card", is introduced into the reader.

According to another characteristic of the invention, it can function in a mode where the programming data contained in the memory of a card introduced into the reader are loaded into the processing unit in order to store them in a memory and to make them resident therein.

According to another characteristic of the invention, it can function in a mode where the resident programming data are transferred into the memory of the card introduced into the reader.

According to another characteristic of the invention, the memories of cards which contain programming data also contain data identifying them as programming cards.

According to another characteristic of the invention, the memories of cards known as key cards contain a code identifying them as key cards.

According to another characteristic of the invention, the memories of cards knwon as key cards contain a code identifying the user.

BRIEF DESCRIPTION OF THE DRAWING

The characteristics of the invention mentioned above, and others, too, will appear more clearly on reading the following description of an embodiment, the said description being made in relation to the attached FIGURE which is a schematic and synoptic view of programmable control apparatus in accordance with the invention.

DETAILED DESCRIPTION OF THE DRAWING

Figure 1:
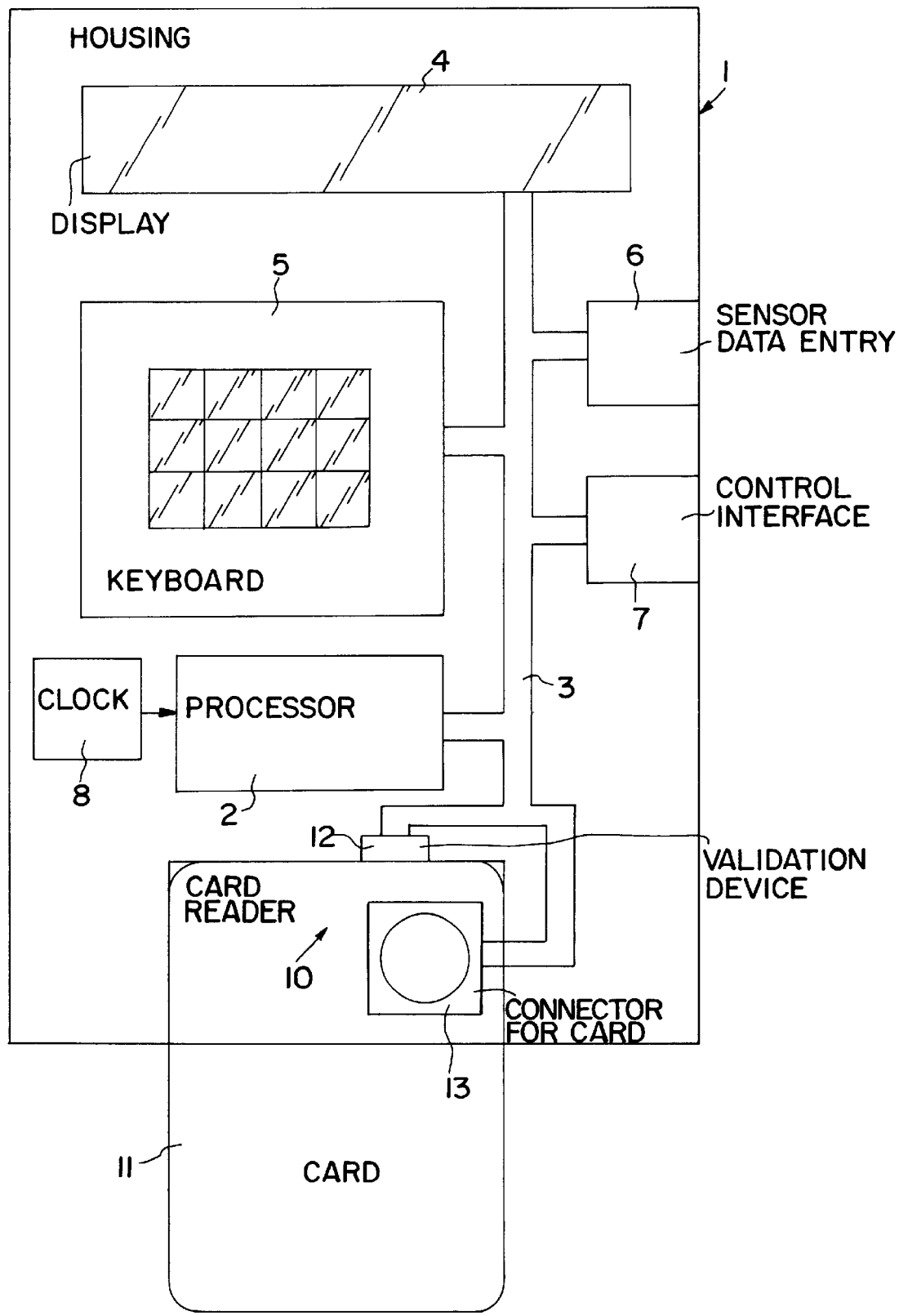

The apparatus represented in the sole FIGURE comprises a single housing, 1, a processing unit, 2, for example of the type with microprocessor or microcontroller, including a bus, 3, to which are linked a display device for giving information, 4, such as a screen of the liquid crystal or other type, a keyboard, 5, an interface for entry, 6, provided to receive measuring signals from one or more heat sensors (not shown) and a control interface, 7, to which is linked at least one control unit for one or more heating appliances (not shown) installed for heating the premises.

It also includes a clock, 8, which, in the mode of production shown, is directly linked to the processing unit, 2.

The functioning of the apparatus as described up to now is the following.

The clock, 8, sends the processing unit, 2, time signals which the processing unit, 2, uses to define the time ranges and to control, via the control interface, 7, within each time range thus defined, the control unit of a heating appliance so that it can operate, for example, either in the mode known as a "comfort mode", or in the mode known as an "economy mode".

In the comfort mode, the control of the heating appliance gives a temperature in the premises which offers a sensation of comfort. In the economy mode, the control of the heating appliance gives a temperature which is lower than the preceding comfort temperature. Between these two modes, other modes can be provided, such as intermediate modes which can be determined according to other parameters apart from temperature, for example, the cost of electricity, etc. Finally, still further modes can be provided such as modes above freezing or a stop mode.

To carry out the commands of the heating appliance as they have just been described, the unit, 2, contains stored programming data which are then known as "resident". These data are provided to allow a programme also contained in unit 2 to be executed according to the data. These programming data define, for example, the time ranges and operating modes of the heating appliance, comfort mode, economy mode, intermediate mode, and other modes which must be controlled in each of the time ranges thus defined.

The unit, 2, according to the mode selected, effects the command mentioned above according to temperature signals delivered via the interface of entry, 6.

It will be seen, however, that it is possible not to link any heat sensor to interface 6. In this case, the apparatus of the invention acts as a time programmer.

It will be seen that, in particular modes of operating, the interface of entry, 6, does not exist. In this case also, the apparatus of the invention acts as a time programmer.

While the apparatus is operating, information on operating conditions is displayed on the device, 4. It can involve time data, adjustment temperature and/or any other information which may be useful to the user.

The apparatus of the invention also includes a reader, 10, of cards, 11, known as "smart cards". Such cards comprise a rectangular flat support, generally made of plastic material, on which an electronic circuit is mounted, generally a memory of the EEPROM type, and also its connection system.

The reader, 10, of the apparatus of the invention consists of a device of validation, 12, and a connector, 13, which is provided to cooperate with the connector of any card introduced into the reader, 10. The connector, 13, is linked to the bus, 3, of the processing unit, 2.

The apparatus of the invention operates in the following manner.

In the first mode, known as mode 0, no card is introduced into the reader, 10. The apparatus operates as above, i.e., the processing unit 2, monitors the interface, 7, according to temperature signals present on the interface, 6, and according to the programming data resident in unit 2. In this mode also, the part of the keyboard, 5, which concerns programming data is deactivated so that it is not possible to modify the resident programming data. In this mode, the keyboard, 5, allows the functionalities of reading programming data, or functionalities of manual forcing of the functioning of the apparatus in one of these functioning modes to be achieved.

In a second mode, known as mode 1, a card, 11, known as the key card, is introduced into the reader, 10.

The card, 11, which is introduced does not have a memory or, if it does have a memory, it contains either a code specific to operating in mode 1 which identifies it as the key card, or a code identifying the user.

When it is introduced, the card, 11, acts as a "stop" against the validation device, 12, which sends a signal to the processing unit, 2, which then activates the keyboard, 5. The modification of resident programming data is then possible, by means of the keyboard, 5, and the visualisation or display device, 4. Once the card, 11, has been withdrawn from the reader, 10, the apparatus operates in mode 0 with the resident programming data as modified.

Where the card, 11, is introduced and carries a code specific to mode 1 or a code identifying the user, the processing unit, 2, reads this code beforehand and verifies its accuracy. According to the result of this verification, the processing unit, 2, either activates or does not activate operating mode 1 of the apparatus.

In this operating mode, the card, 11, when introduced plays the role of a key to allow the user to have access to the programming of his apparatus. This key is more or less complex, depending on whether or not the card has a code identifying the user. This key, like any key, allows the function of programming the apparatus to be blocked to those who do not have it.

In a third operating mode, known as mode 2, a specific card, 11, known as the programme card, is introduced. This specific card includes a memory in which are memorised, on the one hand, a code which identifies it as the programme card and, on the other hand, specific programming data for special applications. When it is introduced into the reader, 10, the memory of the card, 11, is linked, via the connector of the card and the additional card, 12, of the reader, 10, also via the bus, 3, to the processing unit, 2. When this processing unit reads the code identifying the card, it monitors the interface, 7, according to the programming data memorised in the memory of the introduced programme card, 11. In this case, the resident data are in some way deactivated.

The advantage of this mode resides in the fact that it is possible to have several pre-programmed cards for special applications, for example, for applications which depend on the occupation of the premises, the desired temperatures, the determined time ranges, etc.

In a fourth operating mode, known as mode 3, a programme card, 11, is introduced and the processing unit, 2, is advised of this mode, for example, by pressing a particular button of the keyboard, 5, or by punching in a special sequence on the keyboard, 5.

In this mode, the programming data stored in the memory of the introduced card are read and loaded into the processing unit, 2. It is thus possible to make data resident which were until then memorised in the memory of a card, for example, a pre-programmed card which suits the user perfectly.

In a fifth operating mode, known as mode 4, a programme card, 11, is introduced and the processing unit, 2, is advised of this mode, for example, by pressing a special button on the keyboard, 5, or by punching in a special sequence on the keyboard, 5.

In this mode, the programming data residing in the processing unit, 2, are loaded into the memory of the introduced card. It is thus possible to safeguard data which have been the subject of a modification carried out according to mode 1.

We claim:

1. An apparatus for controlling a heating system in any of a plurality of different modes selected in response to a use of a plurality of different types of cards, said apparatus comprising:

data processing means coupled to control said heating system, keyboard means coupled to said data processing means for storing a resident program in said data processor for controlling said heating system in a predetermined manner, card reading means coupled to said data processor, a plurality of different types of cards, means responsive to said card reading means in an absence of a card for establishing a first mode of operation deactivating said keyboard and operating said system in response to sensors, means responsive to a first type of card for causing said card reading means to activate said keyboard means in order to enable a modification of the resident program, means responsive to a second type of card having thereon a memory containing specific data for deactivating said resident program and operating said heating system according to a program stored in said memory on said second type of card, means responsive to a third type of card having thereon a memory containing a user identification number and a stored program for modifying said resident program responsive an entry of said user identification number, and means responsive to a fourth type of card for enabling a user to control said system in response to keying in an identification number.

2. The apparatus of claim 1 wherein there are a plurality of said third type of card so that said heating system may be operated in different ways according to a card selection, whereby said operation of said heating system may be changed according to the time of the day.

3. The apparatus of claim 1 wherein said memory on at least one of said types of cards is an electronic circuit.

4. The apparatus of claim 3 wherein said electronic memory is an EEPROM.

* * * * *